United States Patent [19]
Schulman et al.

[11] 3,917,695
[45] Nov. 4, 1975

[54] PREPARATION OF N-ACETYL-P-AMINOPHENOL

[75] Inventors: Hyman L. Schulman, Fort Lee; Frank A. Baron, Short Hills; Alan E. Weinberg, Verona, all of N.J.

[73] Assignee: Mallinckrodt, Inc., St. Louis, Mo.

[22] Filed: June 26, 1974

[21] Appl. No.: 483,364

Related U.S. Application Data

[63] Continuation of Ser. No. 333,509, Feb. 20, 1973, abandoned, which is a continuation of Ser. No. 33,080, April 29, 1970, abandoned.

[52] U.S. Cl. .......................................... 260/562 A
[51] Int. Cl.² ...................................... C07C 103/10
[58] Field of Search ............................. 260/562 A

[56] References Cited
UNITED STATES PATENTS

| | | |
|---|---|---|
| 2,988,450 | 8/1961 | Nilbert et al. .................. 260/562 A |
| 3,079,435 | 2/1963 | Friefelder et al. ............... 260/562 A |
| 3,113,150 | 12/1963 | Young ............................ 260/562 A |
| 3,341,587 | 9/1967 | Duesel et al. ................... 260/562 A |
| 3,383,416 | 5/1968 | Benner ............................ 260/575 |
| 3,717,680 | 2/1973 | Baron ............................. 260/575 |

Primary Examiner—Allen B. Curtis
Attorney, Agent, or Firm—Wenderoth, Lind & Ponack

[57] ABSTRACT

A method is provided for the preparation of N-acetyl-p-aminophenol in pure form from p-aminophenol whereby the p-aminophenol is dissolved in hot acetic acid, treated with carbon, filtered, and the filtrate treated with acetic anhydride to form N.F. grade N-acetyl-p-aminophenol which is then separated. A further embodiment comprises recycling the mother liquor remaining after separation of the N-acetyl-p-aminophenol for use as a solvent in the treatment of additional quantities of p-aminophenol.

6 Claims, No Drawings

PREPARATION OF N-ACETYL-P-AMINOPHENOL

This application is a continuation of Ser. No. 333,509, filed Feb. 20, 1973, now abandoned which in turn is a continuation of application Ser. No. 33,080, filed Apr. 29, 1970, now abandoned.

The present invention relates to the preparation of N-acetyl-p-aminophenol in pure form from p-aminophenol in a simple and efficient manner.

N-acetyl-p-aminophenol, commonly known as Acetaminophen, is a well known and highly useful pharmaceutical compound. For example, N-acetyl-p-aminophenol is commonly employed as a long term analgesic. In addition to its many uses in the pharmaceutical field, it is also employed as a stabilizer for various materials, e.g., hydrogen peroxide.

In order to qualify for use in the pharmaceutical field and indeed in many non-pharmaceutical applications, it is necessary that the N-acetyl-p-aminophenol meet the National Formulary (N.F.) specifications. For pharmaceutical use, it must be white in its crystal form and impart no appreciable color to tablet or elixirs in which it is present as an active ingredient.

Generally, N-acetyl-p-aminophenol has been produced from p-nitrophenol which is reduced with hydrogen to p-aminophenol. The aminophenol is then acetylated to acetyl aminophenol. The acetylation can be accomplished by carrying out the reduction in the presence of acetic anhydride as described in U.S. Pat. No. 3,076,030 or by addition of acetic anhydride after reduction as described in U.S. Pat. No. 3,079,435. In order to make N-acetyl-p-aminophenol of suitable quality in this manner, the p-nitrophenol must first be extensively purified to free it of p-nitrochlorbenzene from which it is made. In the involved process p-chloroacetanilide is obtained by reduction of the p-nitrochlorbenzene and acetylation of the resulting p-chloro aniline. This chloro compound cannot be tolerated in pharmaceutical grade acetyl aminophenol because of its suspected harmful effects to various organs of the body. Because of this possibility that p-nitrophenol may contain harmful impurities, inherent to its method of manufacture, it is desirable to employ a safer starting material and preferably one that is less costly.

It is well known that a solution or slurry of p-aminophenol in water can be converted to acetyl aminophenol by addition of acetic anhydride. The resulting N-acetyl-p-aminophenol is then filtered and washed with water. In order to obtain a reasonable yield it is preferred to use a slurry containing more than 10% p-aminophenol, because too much N-acetyl-p-aminophenol remains in the filtrate with lower concentrations. Although this procedure for making the acetyl aminophenol is easily carried out, it has not been competitive with the nitrophenol procedure because of the high cost of p-aminophenol. Another disadvantage of this procedure is that commercially available p-aminophenol is not sufficiently pure and the resulting N-acetyl-p-aminophenol requires extensive treatment in order to obtain a suitable color. Most of the material made this way still has too much color when treated in accordance with the teachings of U.S. Pat. No. 3,042,719.

A recently developed improved procedure for making p-aminophenol which involves reduction of nitrobenzene with hydrogen is described in U.S. Pat. No. 3,383,416. Also several procedures for purification of the p-aminophenol obtained in accordance with this patent have recently been developed.

Among these recently developed methods are the following:

A. The crude p-aminophenol is recrystallized from aqueous polyfunctional mild acids, including phosphoric, lactic, glycol and citric acids.

B. The crude p-aminophenol is admixed with a water-immiscible solvent which is substantially a non-solvent for p-aminophenol and which has a boiling point above 40°C and a melting point below 50°C and selected from the group of esters or hydrocarbons and mixtures thereof.

C. An aromatic amine from the group of aniline, toluidines, xylidines and mixtures thereof is brought into contact with crude p-aminophenol and the purified p-aminophenol then is recovered.

p-Aminophenol made this way is much less costly than p-aminophenol made from p-nitrophenol. It also has the advantage that no chloro compounds are involved in its manufacture so there is no possibility of obtaining N-acetyl-p-aminophenol containing this harmful compound.

In spite of the fact that the p-aminophenol made from nitrobenzene is almost white, N-acetyl-p-aminophenol obtained by acetylating this p-aminophenol has too much color to meet the present day color standards for tablets or elixirs unless it is recrystallized several times. Repeated crystallization, of course, results in low yields and increases the cost of manufacture.

We have found that color forming bodies are much more efficiently removed from the p-aminophenol by carbon treatment before acetylation than by the same treatment of the acetylated product. This is done by agitating a concentrated aqueous solution of p-aminophenol with activated carbon at a temperature near the boiling point, filtering the solution to remove the carbon, acetylating the p-aminophenol in the aqueous filtrate by addition of acetic anhydride and recovering the resulting N-acetyl-p-aminophenol crystals by cooling and filtration. The color of this product is satisfactory. However, the yields of first crop crystals are low because large volumes are required due to the limited solubility of p-aminophenol in water. Yields can be increased by the bothersome and expensive procedure involving concentration of the mother liquor and crystallization to obtain a second and third crop of crystals. The solubility of p-aminophenol in water can be increased by addition of inorganic acids such as sulfuric or hydrochloric, but these acids must be neutralized before the p-aminophenol in the filtrate is acetylated, and the salts formed by neutralization interfere in the crystallization if the solution is too concentrated or in recovery of second crop crystals from dilute solutions.

We have found that the addition of acetic acid to mixtures of p-aminophenol and water increases the solubility of the p-aminophenol so that concentrated solutions can be treated with carbon and filtered. Furthermore, the filtrate can be treated directly with acetic anhydride without neutralization of the acetic acid. The N-acetyl-p-aminophenol so obtained has a melting point of above 169°C and has no perceptible color or content of o-acetyl or diacetyl ester. This was unexpected in view of the teachings of U.S. Pat. No. 3,113,150. It has further been found that most of the mother liquor obtained by filtration of the N-acetyl-p-aminophenol can be used in place of fresh acetic acid solutions for treatment of more p-aminophenol and that the use of these mother liquors greatly enhances the yield of the acetyl aminophenol.

It is an object of the present invention to provide a simple and efficient process for the preparation of N.F. grade N-acetyl-p-aminophenol from p-aminophenol whereby acetylation of the p-aminophenol is achieved in an acetic acid medium and whereby the impurities normally associated therewith, particularly color-forming impurities and esters of p-aminophenol, such as 4-acetamino phenyl acetate derivatives, are removed therefrom simply and efficiently.

It is a further object of this invention to provide a procedure for preparing N-acetyl-p-aminophenol which eliminates the possibility of the presence of health-injurious organic chlorocompounds.

These objects are achieved by using p-aminophenol produced by reduction of nitrobenzene with hydrogen, and by treatment of this p-aminophenol with an activated carbon in an aqueous acetic acid solution followed by filtration of the carbon and acetylation of the p-aminophenol in the filtrate with acetic anhydride. When one mol of acetic anhydride reacts with p-aminophenol, one mol of N-acetyl-p-aminophenol and one mol of acetic acid are formed. The efficiency of the procedure is enhanced by using the acetic acid so formed for treatment of subsequent quantities of p-aminophenol.

In order to minimize the formation of additional quantities of impurities it is preferred to carry out the method of the invention in an atmosphere of an inert gas, e.g., nitrogen, carbon dioxide, etc.

The aqueous acetic acid solution of p-aminophenol is preferably formed by dissolving p-aminophenol in a hot, dilute acetic acid solution. Generally, the resulting solution may contain from about 7 percent to about 25 percent by weight, of p-aminophenol although the preferred concentrations are 10 to 16 percent.

The aqueous acetic acid solution may contain 2 to about 25 percent by weight, preferably 7 to about 15 percent of acetic acid. It has been found that acetic acid solutions having these concentrations are the most effective mediums for contact with adsorbent carbon and acetylation.

The aqueous acetic acid solution of p-aminophenol is preferably contacted with the adsorbent carbon at elevated temperatures, preferably, from about 80° to about 98°C. The amount of adsorbent carbon employed is not overly critical and depends in each instance upon the quantity of impurities present in the p-aminophenol and the amount produced when dissolved in acetic acid. The amount of carbon utilized may vary from about 0.5 to about 10 percent by weight, preferably 2 to 5 percent, based on the amount of p-aminophenol present in the aqueous acetic acid solution.

Any of the well known adsorbent carbon materials may be employed, e.g., charcoal, bone black, etc. Generally, it is preferred to employ an activated carbon. Activated carbons are usually prepared by heating the carbon to an elevated temperature, e.g., 800°C with steam or carbon dioxide in the presence of a hygroscopic substance such as zinc chloride or phosphoric acid.

The activated carbon may be in a finely divided form which is added to the solution of p-aminophenol and then filtered, or it may be course in the form of pellets. Such pellets are usually packed in a column and the solution to be treated is passed through it.

The aqueous acetic acid solution of p-aminophenol which has been treated with adsorbent carbon is contacted with a sufficient amount of acetic anhydride to effect acetylation of the p-aminophenol contained therein. Preferably, an amount of acetic anhydride from about 1.0 to about 1.20 moles per mole of p-aminophenol is used. The reaction conditions attendant the acetylation of p-aminophenol are not overly critical. Generally, however, the reaction mixture is maintained at a temperature from about 40° to about 85°C, during acetylation.

Following acetylation of the p-aminophenol solution, the N-acetyl-p-aminophenol may be recovered by any convenient method. The hot reaction medium is usually cooled to effect crystallization of the N-acetyl-p-aminophenol which may then be easily removed, for example, by filtration or centrifugation. Generally, the hot reaction medium may be cooled to about 15°C. to achieve crystallization of the N-acetyl-p-aminophenol. It is to be understood, however, that any of the well known methods of the prior art may be utilized to recover the N-acetyl-p-aminophenol.

The invention will be illustrated by the following nonlimiting examples. The p-aminophenol used in the following examples is prepared as follows:

Nitrobenzene is reduced with hydrogen in sulfuric acid solution as described in Example 1 of U.S. Pat. No. 3,383,416. The reduction is interrupted prior to completion. In order to facilitate separation of the catalyst suspended in the unreacted nitrobenzene, additional nitrobenzene is added after which the lower organic layer of catalyst suspended in nitrobenzene is separated from the upper aqueous layer of p-aminophenol-containing solution. The upper aqueous layer is boiled to distill sufficient water to remove dissolved nitrobenzene, and the nitrobenzene-free solution containing p-aminophenol is obtained. The solution contains up to about 9 percent by weight p-aminophenol and up to 11 to 12 percent by weight sulfuric acid.

185 parts of aniline are added to 1800 parts of the aqueous sulfuric acid solution containing the p-aminophenol. The mixture is neutralized with ammonia to pH 7.2, cooled and filtered on a centrifuge and washed with 30 part portions of aniline and then with 30 parts of toluene, then 30 parts of 2 percent aqueous sodium bisulfite. There is obtained 168 parts of p-aminophenol as wet filter cake (150 parts dry basis). All steps described in the examples were carried out under an atmosphere of nitrogen until the acetylation of the p-aminophenol was complete.

EXAMPLE 1

109 Grams of p-aminophenol are dissolved in 635 cc of 10 percent aqueous acetic acid at 85° to 90°C. The solution is treated with sufficient sodium hydrosulfite (approximately 0.2 grams) to give maximum decolorization. Then 0.5 grams sodium sulfite and 4.3 grams NuChar C-190A are added. The solution is heated to 95°C and 0.1 gram more sodium hydrosulfite is added after which the solution is immediately filtered through a hot funnel coated with diatomaceous earth. The filter cake of carbon is washed with a small quantity of hot water and the wash water and filtrate are cooled to 35° to 40°C. Then 114 grams of acetic anhydride is added over a period of 5 minutes after which the mass is heated to 85°C and then cooled to 10° to 15°C. The resulting slurry of N-acetyl-p-aminophenol is filtered on a centrifuge washed with cold water and dried. The product is white and has a melting point of over 169°C. It analyzed over 99 percent as N-acetyl-p-aminophenol and weighs 110 grams. After one recrystallization from water, it passes all N.F. specifications as well as the more stringent requirements for making pharmaceutical grade tablets.

EXAMPLE 2

109 Grams of p-aminophenol is dissolved in 635 cc of 10 percent aqueous acetic acid at 85° to 90°C. The solution is treated with sufficient sodium hydrosulfite (Ca 0.2 grams) to give maximum de-colorization. Then 0.5 grams sodium sulfite is added after which 114 grams of acetic anhydride is added over a period of 5 minutes. The mass is heated to 85°C and then cooled to 10° to 15°C. The resulting slurry is filtered on a centrifuge, washed with cold water and dried. The dry product has a melting point of over 169°, analyzes over 99 percent acetyl aminophenol and weighs 112 grams. However, it has a deep pink color and after two recrystallizations and treatment with carbon (NuChar C-190A), still has too much color to pass the NF specifications and is unsuitable for making tablets.

EXAMPLE 3

109 Grams of p-aminophenol is slurried in 635 cc water at 85° to 90°C. The slurry is treated with sodium hydrosulfite to tive maximum de-colorization. Then 0.5 grams of sodium sulfite is added after which 114 grams acetic anhydride is added over a period of 5 minutes. Thereafter, the N-acetyl-p-aminophenol is isolated as described in Example 2. This product also has a pink color which is not completely removed by two recrystallizations from water.

EXAMPLE 4

Half of the filtrate obtained by filtration of the N-acetyl-p-aminophenol in Example 1 is diluted to 635 cc with water. Then 109 grams p-aminophenol is added at 85°–90°C. Thereafter, the solution is de-colorized, treated with carbon, acetylated and otherwise worked up exactly as in Example 1. The product is white, has a melting point of over 169°C and analyzes over 99 percent N-acetyl-p-aminophenol. It weighs 128 grams. After one recrystallization from water it passes all NF specifications as well as the more stringent specifications for making pharmaceutical grade tablets.

EXAMPLE 5

Eighty percent of a filtrate obtained by filtration of N-acetyl-p-aminophenol made as described in Example 1 is heated to 85° to 90°C and 109 grams of p-aminophenol is added. Thereafter, the solution is de-colorized, treated with carbon, acetylated and otherwise worked up as in Example 1. The product is white, has a melting point of over 169°C and analyzes over 99 percent N-acetyl-p-aminophenol. It weighs 140 grams and passes all N.F. specifications.

EXAMPLE 6

1620 Grams of p-aminophenol dissolved in 11 liters of 10 percent acetic acid at 80°C is passed through two columns containing 12 × 40 mesh activated carbon at a rate of 13 cc per minute. The columns are connected in series. Both columns are 2 cm. in diameter. The first column in the line is 1 ft. high and the second is 5 ft. high. The effluent from the column is acetylated using 1.15 mols of acetic anhydride for each mol of p-aminophenol. The resulting N-acetyl-p-aminophenol is white and has a melting point of over 169°C. It analyzes over 99 percent N-acetyl-p-aminophenol and passes the N.F. specifications.

Example 1 demonstrates the advantage of carbon treatment of a p-aminophenol solution in acetic acid prior to acetylation. In Examples 2 and 3, where the p-aminophenol is acetylated prior to carbon treatment, the resulting N-acetyl-p-aminophenol has too much color and cannot be made satisfactory in color by two crystallizations from water. Examples 4 and 5 show the advantages in yield obtained by reuse of mother liquor remaining after separation of the acetyl aminophenol in place of acetic acid as a solvent for treatment of additional quantities of p-aminophenol.

What is claimed is:

1. A method for the preparation of substantially pure N-acetyl-p-aminophenol which comprises catalytically hydrogenating nitrobenzene is aqueous sulfuric acid in the presence of platinum, palladium or a mixture thereof as catalyst, separating the catalyst from the reaction mixture, adding aniline to the reaction mixture, neutralizing the reaction mixture, separating p-aminophenol from the neutralized mixture, then dissolving the p-aminophenol in aqueous acetic acid to form a concentrated solution of the p-aminophenol, contacting the resultant concentrated solution with an activated adsorbent carbon at a temperature of from about 80° to about 98°C, separating the solution from the carbon and directly acetylating the p-aminophenol in the solution with acetic anhydride to form N-acetyl-p-aminophenol.

2. The method according to claim 1, wherein said aqueous acetic acid solution of p-aminophenol contains from about 7.0 to about 25 percent, by weight, of p-aminophenol.

3. The method according to claim 1, wherein said aqueous acetic acid solution contains from about 2 to about 25 percent, by weight of acetic acid.

4. The method according to claim 1, wherein N-acetyl-p-aminophenol is filtered from the acetylation reaction medium and the filtrate is recycled to provide at least a portion of said aqueous acetic acid.

5. The method according to claim 1, whereby the absorbent carbon is granular carbon and the said p-aminophenol solution is contacted by passage through and over said carbon.

6. A method for the preparation of substantially pure N-acetyl-p-aminophenol which comprises catalytically hydrogenating nitrobenzene in aqueous sulfuric acid in the presence of platinum, palladium or a mixture thereof as catalyst, separating the catalyst from the reaction mixture, adding aniline to the reaction mixture, neutralizing the reaction mixture, separating p-aminophenol from the neutralized mixture, then dissolving the p-aminophenol in aqueous acetic acid to form a concentrated solution of the p-aminophenol, said concentrated solution containing from about 10 to about 16 percent by weight of p-aminophenol and from about 7 to about 10 percent by weight of acetic acid, contacting the resultant concentrated solution with an activated adsorbent carbon at a temperature of from about 80° to about 98°C, separating the solution from the carbon and directly acetylating the p-aminophenol in the solution with from about 1.0 to about 1.2 moles of acetic anhydride per mole of p-aminophenol to form N-acetyl-p-aminophenol, the method being carried out in an inert atmosphere.

* * * * *